US011171388B2

(12) United States Patent
He et al.

(10) Patent No.: US 11,171,388 B2
(45) Date of Patent: *Nov. 9, 2021

(54) METHOD OF IMPROVING FAST-CHARGEABILITY OF A LITHIUM BATTERY

(71) Applicant: Nanotek Instruments, Inc., Dayton, OH (US)

(72) Inventors: Hui He, Dayton, OH (US); Chueh Liu, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/006,138

(22) Filed: Jun. 12, 2018

(65) Prior Publication Data

US 2019/0379021 A1 Dec. 12, 2019

(51) Int. Cl.
*H01M 2/16* (2006.01)
*H01M 10/0525* (2010.01)
(Continued)

(52) U.S. Cl.
CPC ......... *H01M 50/449* (2021.01); *H01M 4/382* (2013.01); *H01M 4/587* (2013.01);
(Continued)

(58) Field of Classification Search
CPC .. H01M 10/52; H01M 10/525; H01M 10/058; H01M 2004/027; H01M 2/1646;
(Continued)

(56) References Cited

U.S. PATENT DOCUMENTS 5,109,070 A 4/1992 Epstein et al.
5,961,672 A * 10/1999 Skotheim .......... H01M 10/0565
29/623.5
(Continued)

FOREIGN PATENT DOCUMENTS

KR 1020090088405 A 8/2009
KR 1020150004358 U 12/2015

OTHER PUBLICATIONS

Comparative study on the ionic conductivities and redox properties o fLiPF6 and LiTFSI electrolytes and teh characteristics of their rechargeable lithium ion batteries; A. R. Septiana et al 2018 IOP Conf. Ser. Mater. Sci> Eng. 432 012061 (Year: 2018).*

(Continued)

*Primary Examiner* — Sarah A. Slifka
*Assistant Examiner* — Rachel L Zhang

(57) ABSTRACT

Provided is method of improving fast-chargeability of a lithium secondary battery, wherein the method comprises disposing a lithium ion reservoir between an anode and a porous separator and configured to receive lithium ions from the cathode through the porous separator when the battery is charged and to enable the lithium ions to enter the anode in a time-delayed manner. In some embodiments, the reservoir comprises a conducting porous framework structure having pores and lithium-capturing groups residing in the pores, wherein the lithium-capturing groups are selected from (a) redox forming species that reversibly form a redox pair with a lithium ion; (b) electron-donating groups interspaced between non-electron-donating groups; (c) anions and cations wherein the anions are more mobile than the cations; or (d) chemical reducing groups that partially reduce lithium ions from $Li^{+1}$ to $Li^{+\delta}$, wherein $0<\delta<1$.

15 Claims, 4 Drawing Sheets

(51) Int. Cl.
    *H01M 10/052* (2010.01)
    *H01M 10/058* (2010.01)
    *H01M 4/38* (2006.01)
    *H01M 4/587* (2010.01)
    *H01M 50/449* (2021.01)
    *H01M 50/411* (2021.01)
    *H01M 50/431* (2021.01)
    *H01M 50/446* (2021.01)
    *H01M 4/02* (2006.01)

(52) U.S. Cl.
    CPC ....... *H01M 10/052* (2013.01); *H01M 10/058* (2013.01); *H01M 10/0525* (2013.01); *H01M 50/411* (2021.01); *H01M 50/431* (2021.01); *H01M 50/446* (2021.01); *H01M 2004/027* (2013.01)

(58) Field of Classification Search
    CPC .. H01M 2/1653; H01M 2/166; H01M 2/1686; H01M 4/382; H01M 4/587; H01M 4/366
    See application file for complete search history.

(56) References Cited

U.S. PATENT DOCUMENTS

| | | |
|---|---|---|
| 7,301,002 B1 | 11/2007 | Cornelius et al. |
| 8,859,143 B2 | 10/2014 | Zhamu et al. |
| 8,895,189 B2 | 11/2014 | Zhamu et al. |
| 2001/0038948 A1* | 11/2001 | Jacobs ............... H01M 10/052 429/304 |
| 2004/0131934 A1* | 7/2004 | Sugnaux ............. H01G 9/2031 429/209 |
| 2005/0165213 A1 | 7/2005 | Dang et al. |
| 2007/0048612 A1 | 3/2007 | Nakajima et al. |
| 2015/0050561 A1 | 2/2015 | Zhang et al. |
| 2016/0019995 A1 | 1/2016 | Zhamu et al. |
| 2016/0181658 A1 | 6/2016 | Kim et al. |
| 2016/0301068 A1* | 10/2016 | Werner ............... H01M 4/0423 |
| 2016/0336614 A1* | 11/2016 | Hatta ...................... B60K 6/46 |
| 2016/0372764 A1* | 12/2016 | Kim ................... H01M 10/486 |
| 2017/0294644 A1* | 10/2017 | Burshtain ........... H01M 4/0471 |
| 2017/0294648 A1 | 10/2017 | Burshtain et al. |
| 2017/0294678 A1 | 10/2017 | Lee et al. |
| 2019/0379045 A1* | 12/2019 | He ........................ H01M 4/366 |

OTHER PUBLICATIONS

PCT/US19/36051 International Search Report and Written Opinion dated Oct. 15, 2019, 11 pages.

Chen et al., "Three-dimensional Flexible and Conductive Interconnected Graphene Networks Grown by Chemical Vapor Deposition" Nature Materials (2011) vol. 10, pp. 424-428.

Choi et al., "3D Macroporous Graphene Frameworks for Supercapacitors with High Energy and Power Densities" ACS Nano (2012) vol. 6, pp. 4020-4028.

Xu et al., "Self-Assembled Graphene Hydrogel via a One-Step Hydrothermal Process" ACS Nano (2010) vol. 4, No. 7, pp. 4324-4330.

U.S. Appl. No. 16/006,131 Nonfinal Office Action dated Feb. 6, 2020, 12 pages.

* cited by examiner

METHOD OF IMPROVING FAST-CHARGEABILITY OF A LITHIUM BATTERY

FIELD OF THE INVENTION

The present invention provides a fast-chargeable lithium-ion battery and a lithium metal battery (having lithium metal or metal alloy as the main anode active material).

BACKGROUND

Rechargeable lithium-ion (Li-ion) and rechargeable lithium metal batteries (e.g. lithium-sulfur, lithium-selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or lithium intercalation compound as an anode active material (except $Li_{4.4}Si$, which has a specific capacity of 4,200 mAh/g). Hence, in general, Li metal batteries (having a lithium metal anode) have a significantly higher energy density than lithium-ion batteries (e.g. having a graphite anode).

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode to the cathode through the electrolyte and the cathode became lithiated. Unfortunately, upon repeated charges and discharges, the lithium metal resulted in the formation of dendrites at the anode that ultimately caused internal shorting, thermal runaway, and explosion. As a result of a series of accidents associated with this problem, the production of these types of secondary batteries was stopped in the early 1990's giving ways to lithium-ion batteries.

Even now, cycling stability and safety concerns remain the primary factors preventing the further commercialization of Li metal batteries (e.g. Lithium-sulfur and Lithium-transition metal oxide cells) for EV, HEV, and microelectronic device applications. Again, cycling stability and safety issues of lithium metal rechargeable batteries are primarily related to the high tendency for Li metal to form dendrite structures during repeated charge-discharge cycles or overcharges, leading to internal electrical shorting and thermal runaway. This thermal runaway or even explosion is caused by the organic liquid solvents used in the electrolyte (e.g. carbonate and ether families of solvents), which are unfortunately highly volatile and flammable.

Many attempts have been made to address the dendrite and thermal runaway issues. However, despite these earlier efforts, no rechargeable Li metal batteries have succeeded in the market place. This is likely due to the notion that these prior art approaches still have major deficiencies. For instance, in several cases, the anode or electrolyte structures designed for prevention of dendrites are too complex. In others, the materials are too costly or the processes for making these materials are too laborious or difficult. In most of the lithium metal cells and lithium-ion cells, the electrolyte solvents are flammable. An urgent need exists for a simpler, more cost-effective, and easier to implement approach to preventing Li metal dendrite-induced internal short circuit and thermal runaway problems in Li metal batteries and other rechargeable lithium batteries.

These concerns over the safety of earlier lithium metal secondary batteries led to the development of lithium-ion batteries, in which pure lithium metal sheet or film was replaced by carbonaceous materials (e.g. natural graphite particles) as the anode active material. The carbonaceous material absorbs lithium (through intercalation of lithium ions or atoms between graphene planes, for instance) and desorbs lithium ions during the re-charge and discharge phases, respectively, of the lithium-ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost, safety, and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-170 mAh/g. As a result, the specific energy of commercially available Li-ion cells is typically in the range from 120-220 Wh/kg, most typically 150-180 Wh/kg. These specific energy values are two to three times lower than what would be required for battery-powered electric vehicles to be widely accepted.

Furthermore, the same flammable solvents previously used for lithium metal secondary batteries are also used in most of the lithium-ion batteries. Despite the notion that there is significantly reduced propensity of forming dendrites in a lithium-ion cell (relative to a lithium metal cell), the lithium-ion cell has its own intrinsic safety issue. For instance, the transition metal elements in the lithium metal oxide cathode are highly active catalysts that can promote and accelerate the decomposition of organic solvents, causing thermal runaway or explosion initiation to occur at a relatively low electrolyte temperature (e.g. <200° C., as opposed to normally >400° C. without the catalytic effect).

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the ionic salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself as charges and discharges are repeated. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

With the rapid development of hybrid (HEV), plug-in hybrid electric vehicles (HEV), and all-battery electric vehicles (EV), there is an urgent need for anode and cathode materials and electrolytes that provide a rechargeable battery with a significantly higher specific energy, higher energy density, higher rate capability, long cycle life, and safety. One of the most promising energy storage devices is the lithium-sulfur (Li—S) cell since the theoretical capacity of Li is 3,861 mAh/g and that of S is 1,675 mAh/g. In its simplest form, a Li—S cell consists of elemental sulfur as the positive electrode and lithium as the negative electrode. The lithium-sulfur cell operates with a redox couple, described by the reaction $S_8+16Li \leftrightarrow 8Li_2S$ that lies near 2.2 V with respect to $Li^+/Li°$. This electrochemical potential is approximately ⅔ of that exhibited by conventional positive electrodes. However, this shortcoming is offset by the very high theoretical capacities of both Li and S. Thus, compared with conventional intercalation-based Li-ion batteries, Li—S cells have the opportunity to provide a significantly higher energy density (a product of capacity and voltage). Values can approach 2,500 Wh/kg or 2,800 Wh/l based on the combined Li and S weight or volume (not based on the total cell weight or volume), respectively, assuming complete reaction to $Li_2S$. With a proper cell design, a cell-level specific energy of 1,200 Wh/kg (of cell weight) and cell-level energy density of 1,400 Wh/l (of cell volume) should be achievable. However, the current Li-sulfur experimental cells of industry leaders in sulfur cathode technology have a maximum cell specific energy of 250-400 Wh/kg (based on the total cell weight), far less than what could be obtained in real practice.

In summary, despite its considerable advantages, the rechargeable lithium metal cell in general and the Li—S cell and the Li-Air cell in particular are plagued with several major technical problems that have hindered its widespread commercialization:

(1) Conventional lithium metal secondary cells (e.g., rechargeable Li metal cells, Li—S cells, and Li-Air cells) still have dendrite formation and related internal shorting and thermal runaway issues. Also, conventional Li-ion cells still make use of significant amounts of flammable liquids (e.g. propylene carbonate, ethylene carbonate, 1,3-dioxolane, etc.) as the primary electrolyte solvent, risking danger of explosion;

(2) The tendency for a lithium metal anode to form dendrites is presumably caused by the low deposition rate of the returning lithium ions onto the Cu foil current collector (and the metal film previously deposited thereon) during the recharge step. This also implies that a lithium metal cell cannot be recharged rapidly;

(3) The Li—S cell tends to exhibit significant capacity degradation during discharge-charge cycling. This is mainly due to the high solubility of the lithium polysulfide anions formed as reaction intermediates during both discharge and charge processes in the polar organic solvents used in electrolytes. During cycling, the lithium polysulfide anions can migrate through the separator and electrolyte to the Li negative electrode whereupon they are reduced to solid precipitates ($Li_2S_2$ and/or $Li_2S$), causing active mass loss. In addition, the solid product that precipitates on the surface of the positive electrode during discharge can become electrochemically irreversible, which also contributes to active mass loss.

More generally speaking, a significant drawback with cells containing cathodes comprising elemental sulfur, organosulfur and carbon-sulfur materials relates to the dissolution and excessive out-diffusion of soluble sulfides, polysulfides, organo-sulfides, carbon-sulfides and/or carbon-polysulfides (hereinafter referred to as anionic reduction products) from the cathode into the rest of the cell. This phenomenon is commonly referred to as the Shuttle Effect. This process leads to several problems: high self-discharge rates, loss of cathode capacity, corrosion of current collectors and electrical leads resulting in loss of electrical contact to active cell components, fouling of the anode surface giving rise to malfunction of the anode, and clogging of the pores in the cell membrane separator which leads to loss of ion transport and large increases in internal resistance in the cell.

In response to these challenges, new electrolytes, protective films for the lithium anode, and solid electrolytes have been developed. Some interesting cathode developments have been reported recently to contain lithium polysulfides; but, their performance still fall short of what is required for practical applications. Despite the various approaches proposed for the fabrication of high energy density rechargeable cells containing elemental sulfur, organo-sulfur and carbon-sulfur cathode materials, or derivatives and combinations thereof, there remains a need for materials and cell designs that (a) retard or reduce the out-diffusion of anionic reduction products, from the cathode compartments into other components in these cells, (b) improve the battery safety, and (c) provide rechargeable cells with high capacities over a large number of cycles.

Although solid electrolytes are effective in addressing the lithium metal dendrite and flammability issues, conventional solid-state electrolytes have the following major deficiencies: low lithium ion conductivities (typically $\ll 10^{-4}$ S/cm, more typically $\ll 10^{-5}$ S/cm, and further more typically $\ll 10^{-6}$ S/cm), difficulty in making solid-state electrolyte (high temperature sintering typically required) and implementing it in a battery cell, extreme brittleness, no flexibility (hence, not being compliant and being in poor ionic contact with the anode and/or cathode and, hence, poor active material utilization efficiency), and high costs. The low lithium ion conductivity A specific object of the present invention is to provide a lithium-ion battery or rechargeable lithium metal battery (e.g. Li—S battery) that can be rapidly recharged and exhibits a high specific energy, a long cycle-life, and a high level of safety.

A very important object of the present invention is to provide a simple, cost-effective, and easy-to-implement approach to preventing potential Li metal dendrite-induced internal short circuit and thermal runaway problems in various fast-charging Li metal and Li-ion batteries.

SUMMARY OF THE INVENTION

The present invention provides a lithium secondary battery, as schematically illustrated in FIG. 1, comprising an anode, a cathode, a porous separator disposed between the anode and the cathode, an electrolyte, and a lithium ion reservoir disposed between the anode and the porous separator and configured to receive lithium ions from the cathode through the porous separator when the battery is charged and enable the lithium ions to enter the anode in a time-delayed manner, wherein the lithium ion reservoir comprises an electron-conducting and/or lithium ion-conducting porous framework structure having pores, having a pore size from 1 nm to 500 μm, and lithium-capturing groups residing in the pores, wherein the lithium-capturing groups are selected from (a) redox forming species that reversibly form a redox pair with a lithium ion when said battery is charged; (b) electron-donating groups interspaced between non-electron-donating groups; (c) anions and cations wherein the anions are more mobile than the cations; or (d) chemical reducing groups that partially reduce lithium ions from $Li^{+1}$ to $Li^{+\delta}$, wherein $0<\delta<1$.

The lithium secondary battery can be a lithium-ion battery wherein the anode contains particles of graphite, Si, $SiO_x$, Sn, $SnO_2$, Ge, etc. as the main anode active material. The battery may be a rechargeable lithium metal battery, such as a lithium-sulfur battery, a lithium-selenium battery, or a lithium-air battery, wherein the anode contains lithium metal (e.g. Li foil) or lithium metal alloy (containing at least 60% by weight of Li element).

The present invention also provides a method of improving fast-chargeability of a lithium secondary battery containing an anode, a cathode, a porous separator disposed between the anode and the cathode, and an electrolyte, wherein the method comprises disposing a lithium ion reservoir between the anode and the porous separator and configured to receive lithium ions from the cathode through the porous separator when the battery is charged and to enable the lithium ions to enter the anode in a time-delayed manner.

In the method, the lithium ion reservoir may comprise an electron-conducting or lithium ion-conducting porous framework structure having pores, having a pore size from 1 nm to 500 μm, and lithium-capturing groups residing in the pores, wherein the lithium-capturing groups are selected from (a) redox forming species that reversibly form a redox pair with a lithium ion when the battery is charged; (b) electron-donating groups interspaced between non-electron-donating groups; (c) anions and cations wherein the anions are more mobile than the cations; or (d) chemical reducing groups that partially reduce lithium ions from $Li^{+1}$ to $Li^{+\delta}$, wherein $0<\delta<1$.

In certain embodiments, the lithium ion reservoir comprises an ionic liquid hosted by a porous structure.

In some embodiments, the lithium-capturing group is selected from a molecule having a core or backbone structure and at least a side group that is ionic or electron rich. The core or backbone structure may contain an aryl, heterocycloalkyl, crown etheryl, cyclamyl, cyclenyl, 1,4,7-triazacyclononayl, hexacyclenyl, cryptandyl, naphtalenyl, antracenyl, phenantrenyl, tetracenyl, chrysenyl, tryphenylenyl, pyrenyl, pentacenyl, single-benzene or cyclic structure, double-benzene or bi-cyclic structure, or multiple-cyclic structure having 3-10 benzene rings.

The side group may contain $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M'_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; and $M^2$ is selected from Be, Mg, Ca, Sr, or Ba. These side groups, when attached to a cyclic core/backbone structure having 1-5 benzene rings, appear to be capable of partially or tentatively reducing lithium ions in the reservoir from $Li^{+1}$ to $Li^{-\delta}$, wherein $0<\delta<1$.

In some specific embodiments, the redox pair with lithium is selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate, poly(lithium-4-styrenesulfonate, lithium sulfate, lithium phosphate, lithium phosphate monobasic, lithium trifluoromethanesulfonate, lithium 1,1,2,2,3,3,4,4,5, 5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof.

Electron-donating groups may be selected from those molecules having one to 10 benzene rings or cyclic structure as the core/backbone portion having conjugated double bonds, acidic groups, etc. Examples include sodium 4-methylbenzenesulfonate, sodium 3,5-dicarboxybenzenesulfonate, sodium 2,6-dimethylbenzene-1,4-disulfonate, and sodium aniline sulfonate. These molecules in the lithium ion reservoir appear to be capable of partially reducing the incoming lithium ions that pass through the porous separator from the cathode.

The lithium ion-capturing group may contain a salt that is dissociated into an anion and a cation in a liquid medium (typically an organic solvent). Non-limiting examples of these salts are $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, $1\leq y\leq4$. The liquid medium to dissolve these salts may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, hydrofluoro ether (HFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), diethyl carbonate (DEC), alkylsiloxane (Si—O), alkylsilane (Si—C), liquid oligomeric silaxane (—Si—O—Si—), tetraethylene glycol dimethylether (TEGDME), an ionic liquid solvent, or a combination thereof.

The lithium ion-capturing groups may contain ionic liquids, which are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The desired ionic liquids for use in the presently invented lithium ion reservoir preferably have a melting point lower than 60° C., more preferably lower than 0° C., and further more preferably lower than −20° C. The IL salts are characterized by weak interactions, due to the combination of a large cation and a charge-delocalized anion. This results in a low tendency to crystallize due to flexibility (anion) and asymmetry (cation). The anions of the ionic liquid may be selected to be more mobile than the cations.

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

During the battery recharging step, the porous framework structure is configured to receive lithium ions coming from the cathode through the porous separator and tentatively or partially retain the lithium ions (not lithium metal) in the pores of this lithium ion reservoir, typically a thin layer between the anode and the separator. This thin layer of lithium ion reservoir preferably has a thickness from 10 nm to 500 μm, more preferably from 100 nm to 100 μm. This lithium ion reservoir may further contain some electrolyte (e.g. liquid electrolyte).

In some embodiments, the porous framework structure contains a conducting foam, which can be a closed-cell foam or open-cell foam. The open-cell foam is preferred. However, the pores preferably contain mesoscaled pores having a pore size from 2 nm to 100 nm, more preferably from 2 nm to 50 nm, which are more effective in holding certain lithium ion-capturing species.

In some embodiments, the electron-conducting porous structure has pore walls comprising an electron-conducting material selected from carbon nanotubes, carbon nanofibers, graphene sheets, expanded graphite platelets, carbon fibers, graphite fibers, graphite particles, needle coke, mesocarbon microbeads, carbon particles, carbon black, acetylene black, activated carbon particles, or a combination thereof. Multiple fibers or particles of electron-conducting materials optionally may be bonded by a resin binder (0.1%-10%) to improve the structural integrity of the porous structure. Preferably, the electron-conducting porous structure contains a graphene foam.

In certain embodiments, the lithium ion-conducting porous structure comprises a polymer foam or polymer fabric having pores and pore walls. The pore walls comprise a lithium ion-conducting polymer having a lithium ion conductivity from $10^{-8}$ to $10^{-2}$ S/cm when measured at 25° C. The polymer foam may contain some desired amount of an electron-conducting material selected from, for instance, carbon nanotubes, carbon nanofibers, graphene sheets, expanded graphite platelets, carbon fibers, graphite fibers, graphite particles, needle coke, mesocarbon microbeads, carbon particles, carbon black, acetylene black, activated carbon particles, or a combination thereof.

In some embodiments, the lithium ion-conducting polymer is selected from sulfonated polyaniline, sulfonated polypyrrole, a sulfonated polythiophene, sulfonated polyfuran, a sulfonated bi-cyclic polymer, or a combination thereof.

In some embodiments, the lithium ion-conducting polymer is selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, metallocene-based sulfonated poly(ethylene-co-octene) elastomer, sulfonated poly(ethylene-co-butene) elastomer, sulfonated styrene-ethylene-butadiene-styrene elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate, sulfonated thermoplastic elastomer, sulfonated protein resilin, sulfonated protein elastin, sulfonated ethylene oxide-epichlorohydrin copolymer, sulfonated polyurethane, sulfonated urethane-urea copolymer, or a combination thereof.

In some embodiments, the lithium ion-conducting polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

In some embodiments, the lithium ion-conducting polymer is selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, and poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, or a combination thereof.

In the lithium-ion battery, the anode (sometimes referred to as anode electrode) typically is composed of an anode active material, a conductive additive (e.g. carbon black, acetylene black, graphite platelets, carbon nanotubes, etc.), and a resin binder (e.g. the well-known SBR rubber, PVDF, CMC, etc.). In some embodiments, the anode electrode may comprise an anode active material comprising an element selected from Si, Ge, Sn, Cd, Sb, Pb, Bi, Zn, Al, Co, Ni, Ti, or an alloy thereof.

In some embodiments, the anode comprises an anode active material selected from the group consisting of:
   a) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
   b) lithiated and un-lithiated alloys or intermetallic compounds of Si, Ge, Sn, Pb, Sb, Bi, Zn, Al, Ti, Ni, Co, or Cd with other elements;
   c) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites;
   d) lithiated and un-lithiated salts and hydroxides of Sn;
   e) lithium titanate, lithium manganate, lithium aluminate, lithium-containing titanium oxide, lithium transition metal oxide;
   f) lithiated and un-lithiated particles of natural graphite, artificial graphite, mesocarbon microbeads, hard carbon (commonly defined as the carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube;
   and combinations thereof.

The particles of an anode active material (e.g. Si, Ge, $SiO_x$, Sn, $SnO_2$, etc., wherein x=0.01-1.9) preferably have a diameter from 10 nm to 1 μm, more preferably from 20 to 500 nm, and most preferably from 20 to 100 nm.

The electrolyte used in the instant lithium battery may be selected from a non-aqueous liquid electrolyte, polymer gel electrolyte, polymer electrolyte, quasi-solid electrolyte, solid-state inorganic electrolyte, ionic liquid electrolyte, or a combination thereof.

In certain embodiments, the electrolyte comprises a lithium ion-conducting inorganic species or lithium salt selected from lithium perchlorate $LiClO_4$, lithium hexafluorophosphate $LiPF_6$, lithium borofluoride $LiBF_4$, lithium hexafluoroarsenide $LiAsF_6$, lithium trifluoro-metasulfonate $LiCF_3SO_3$, bis-trifluoromethyl sulfonylimide lithium $LiN(CF_3SO_2)_2$, lithium bis(oxalato)borate LiBOB, lithium oxalyldifluoroborate $LiBF_2C_2O_4$, lithium oxalyldifluoroborate $LiBF_2C_2O_4$, lithium nitrate $LiNO_3$, Li-fluoroalkyl-phosphates $LiPF_3(CF_2CF_3)_3$, lithium bisperfluoro-ethysulfonylimide LiBETI, lithium bis(trifluoromethanesulfonyl)imide, lithium bis(fluorosulfonyl)imide, lithium trifluoromethanesulfonimide LiTFSI, an ionic liquid-based lithium salt, or a combination thereof.

The electrolyte may comprise a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, an ionic liquid solvent, or a combination thereof.

The electrolyte is preferably a non-flammable electrolyte e.g. an electrolyte having a flash point higher than 150° C., preferably higher than 200° C., and most preferably no detectable flash point (flash point being too high to be detectable or the amount of organic vapor being too little to detect at a temperature as high as 200° C.).

The non-flammable electrolyte can be a room temperature ionic liquid. Alternatively, the non-flammable electrolyte contains a solid polymer electrolyte or an inorganic solid electrolyte.

In certain embodiments, a non-flammable quasi-solid electrolyte contains a lithium salt dissolved in a liquid solvent having a lithium salt concentration from 3.5 M to 14.0 M (more typically from 3.5 M to 10 M and further more typically from 5.0 M to 7.5 M) so that the electrolyte exhibits a vapor pressure less than 0.01 kPa when measured at 20° C., a vapor pressure less than 60% of the vapor pressure of the liquid solvent alone, a flash point at least 20 degrees Celsius higher than a flash point of the liquid solvent alone, a flash point higher than 150° C., or no flash point.

In certain embodiments, a non-flammable quasi-solid electrolyte contains a lithium salt dissolved in a mixture of a liquid solvent and a liquid additive having a lithium salt concentration from 1.5 M to 5.0 M so that the electrolyte exhibits a vapor pressure less than 0.01 kPa when measured at 20° C., a vapor pressure less than 60% of the vapor pressure of the liquid solvent alone, a flash point at least 20 degrees Celsius higher than a flash point of the liquid solvent alone, a flash point higher than 150° C., or no flash point. The liquid additive, different in composition than the liquid solvent, is selected from hydrofluoro ether (HFE), trifluoro propylene carbonate (FPC), methyl nonafluorobutyl ether (MFE), fluoroethylene carbonate (FEC), tris(trimethylsilyl) phosphite (TTSPi), triallyl phosphate (TAP), ethylene sulfate (DTD), 1,3-propane sultone (PS), propene sultone (PES), diethyl carbonate (DEC), alkylsiloxane (Si—O), alkylsilane (Si—C), liquid oligomeric silaxane (—Si—O—Si—), tetraethylene glycol dimethylether (TEGDME), canola oil, or a combination thereof. The liquid additive-to-liquid solvent ratio in the mixture is from 5/95 to 95/5 by weight, preferably from 15/85 to 85/15 by weight, further preferably from 25/75 to 75/25 by weight, and most preferably from 35/65 to 65/35 by weight.

There is no limitation on the type of cathode active materials that can be incorporated in the cathode. Any commonly used cathode active material for a lithium-ion battery or lithium metal battery can be used for practicing the present invention. The cathode active material may be selected from an inorganic material, an organic or polymeric material, a metal oxide, metal phosphate, metal sulfide, metal halide, metal selenide, or a combination thereof.

As some non-limiting examples, the metal oxide/phosphate/sulfide/selenide/halide may be selected from a lithium cobalt oxide, lithium nickel oxide, lithium manganese oxide, lithium vanadium oxide, lithium-mixed metal oxide (e.g. the well-known NCM and NCA), lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, lithium selenide, magnesium polysulfide, or a combination thereof.

In some embodiments, the cathode active material is selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from $TiS_2$, $TaS_2$, $MoS_2$, $NbSe_3$, $MnO_2$, $CoO_2$, an iron oxide, a vanadium oxide, or a combination thereof.

In some embodiments, the metal oxide/phosphate/sulfide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. In some embodiments, the metal oxide/phosphate/sulfide is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

The inorganic material for use as a cathode active material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

In some embodiments, the organic material or polymeric material is selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([$(NPS_2)_3$]n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof. These compounds are preferably mixed with a conducting material to improve their electrical conductivity and rigidity so as to enable the peeling-off of graphene sheets from the graphitic material particles.

The thioether polymer in the above list may be selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

The advantages and features of the present invention will become more transparent with the description of the following best mode practice and illustrative examples.

DETAILED DESCRIPTION OF PREFERRED EMBODIMENTS

The present invention provides a safe and high-performing rechargeable lithium battery, which can be any of the various types of lithium-ion cells (e.g. using graphite or Si as the main anode active material) or lithium metal cells (e.g. Li-metal oxide, Li—S, Li-air, and Li—Se cells, etc. using lithium metal as the main anode active material). For illustration purpose, the following discussion of preferred embodiments is primarily based on Li-ion cells and Li—S cells (as an example), but the same or similar principles and procedures are applicable to all other rechargeable lithium metal batteries (using lithium metal or metal alloy as the anode active material). The cathode active materials can be, for instance, a transition metal oxide (e.g. $V_2O_5$) or sulfide (e.g. $MoS_2$), sulfur or polysulfide (e.g. lithium polysulfide), selenium, metal selenide, or just outside air (for a lithium-air cell).

Figure 1A:
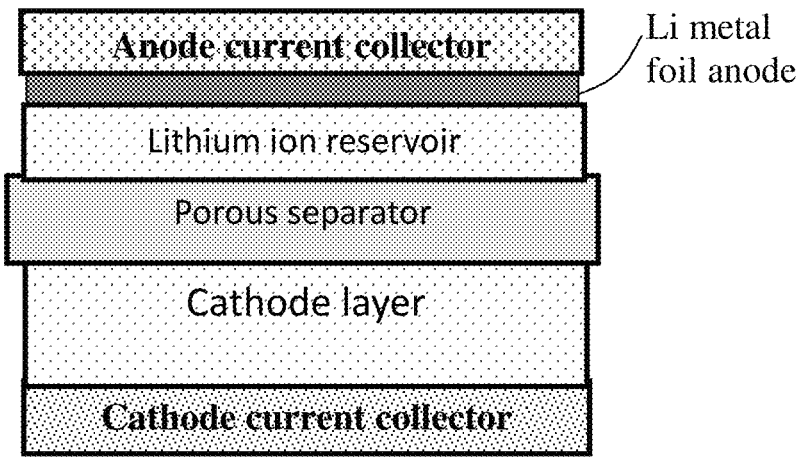
FIG. 1(A) Schematic of a rechargeable lithium metal battery containing a lithium metal anode and a lithium ion reservoir disposed between the anode and the porous separator.
Figure 1B:
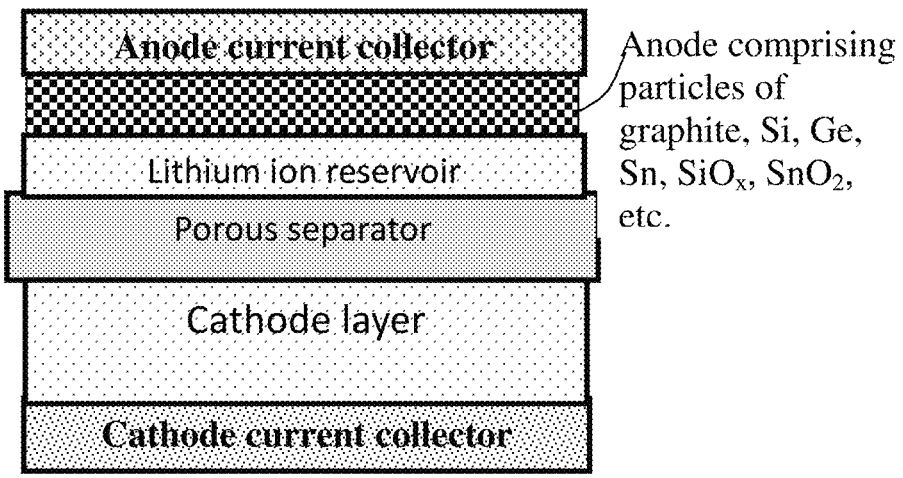
FIG. 1(B) Schematic of a lithium-ion battery containing an anode (comprising particles of an anode active material, such as Si and $SnO_2$, an optional conductive additive, and an optional resin binder) and a lithium ion reservoir disposed between the anode and the porous separator.

The present invention provides a lithium secondary battery, as schematically illustrated in FIG. 1(A) for a lithium metal battery (e.g. having a lithium metal foil or lithium alloy powder layer as the primary anode active material) or FIG. 1(B) for a lithium-ion battery (e.g. having a layer of particles of an anode active material, such as graphite, Si, Ge, Sn, $SnO_2$, and optional conductive additive and resin binder). The lithium secondary battery comprises an anode, a cathode, a porous separator disposed between the anode and the cathode, an electrolyte, and a lithium ion reservoir disposed between the anode and the porous separator and configured to receive lithium ions from the cathode through the porous separator when the battery is charged and enable the lithium ions to enter the anode in a time-delayed manner. The lithium ion reservoir comprises an electron-conducting or lithium ion-conducting porous framework structure having pores, having a pore size from 1 nm to 500 μm, and lithium-capturing groups residing in the pores, wherein the lithium-capturing groups are selected from (a) redox forming species that reversibly form a redox pair with a lithium ion when the battery is charged; (b) electron-donating groups interspaced between non-electron-donating groups; (c) anions and cations wherein the anions are more mobile than the cations; or (d) chemical reducing groups that partially reduce lithium ions from $Li^{+1}$ to $Li^{+\delta}$, wherein $0<\delta<1$.

The term "in a time-delayed manner" means that (a) at least a portion (e.g. no less than 10%) of the lithium ions that enter the lithium ion reservoir does not immediately enter the anode layer (but being retained in the reservoir) when the battery is charged at a charging rate of 5 C or higher; or (b) when the external battery charger is switched off or unplugged, at least a portion of the of the lithium ions that enter the lithium ion reservoir remains in the reservoir and continues to enter the anode and the anode active material (i.e. the internal charging procedure continues even though the external charger is off). The presently invented lithium ion reservoir strategy enables the charging process to be conducted in a time-delayed manner to allow most of the available lithium ions to eventually get charged into the anode active material. Without such a lithium ion reservoir, fast charging can lead to either a significantly lower amount of lithium ions that actually get intercalated or inserted into the anode active material or the formation of lithium metal plating and dangerous lithium dendrite formation.

In some embodiments, the lithium-capturing group is selected from a molecule having a core or backbone structure and at least a side group that is ionic or electron-rich in nature. The core or backbone structure may contain an aryl, heterocycloalkyl, crown etheryl, cyclamyl, cyclenyl, 1,4,7-triazacyclononayl, hexacyclenyl, cryptandyl, naphtalenyl, antracenyl, phenantrenyl, tetracenyl, chrysenyl, tryphenylenyl, pyrenyl, pentacenyl, single-benzene or cyclic structure, double-benzene or bi-cyclic structure, or multiple-cyclic structure having 3-10 benzene rings. The side group may contain $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; $M^2$ is selected from Be, Mg, Ca, Sr, or Ba.

In some specific embodiments, the redox pair with lithium is selected from lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate, poly(lithium-4-styrenesulfonate, lithium sulfate, lithium phosphate, lithium phosphate monobasic, lithium trifluoromethanesulfonate, lithium 1,1,2,2,3,3,4,4,5, 5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, or a combination thereof.

Electron-donating groups may be selected from those molecules having one to 10 benzene rings or cyclic structure as the core/backbone portion having conjugated double bonds, acidic groups, etc. Examples include sodium 4-methylbenzenesulfonate, sodium 3,5-dicarboxybenzenesulfonate, sodium 2,6-dimethylbenzene-1,4-disulfonate, and sodium aniline sulfonate. These molecules in the lithium ion reservoir appear to be capable of partially reducing the incoming lithium ions that pass through the porous separator from the cathode.

The lithium ion-capturing group may contain a salt that is dissociated into an anion and a cation in a liquid medium (typically an organic solvent). Non-limiting examples of these salts are $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, $Na_2CO_3$, $Na_2O$, $Na_2C_2O_4$, $NaOH$, $NaX$, $ROCO_2Na$, $HCONa$, $RONa$, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x<1$, $1<y<4$. The liquid medium to dissolve these salts may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, hydrofluoro ether (HFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), diethyl carbonate (DEC), alkylsiloxane (Si—O), alkylsilane (Si—C), liquid oligomeric silaxane (—Si—O—Si—), tetraethylene glycol dimethylether (TEGDME), an ionic liquid solvent, or a combination thereof.

The lithium ion-capturing groups may contain ionic liquids, which are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The desired ionic liquids for use in the presently invented lithium ion reservoir preferably have a melting point lower than 60° C., more preferably lower than 0° C., and further more preferably lower than −20° C. The IL salts are characterized by weak interactions, due to the combination of a large cation and a charge-delocalized anion. This results in a low tendency to crystallize due to flexibility (anion) and asymmetry (cation). The anions of the ionic liquid may be selected to be more mobile than the cations.

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{23}$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{23}^-$ results in RTILs with good working conductivities.

In the lithium secondary battery, the pores preferably contain mesoscaled pores having a pore size from 2 nm to 100 nm, preferably from 2 nm to 50 nm. These mesopores are particularly effective in holding the lithium-capturing groups inside the pores to perform their intended functions.

In some embodiments, the electron-conducting porous structure has pore walls comprising an electron-conducting material selected from carbon nanotubes, carbon nanofibers, graphene sheets, expanded graphite platelets, carbon fibers, graphite fibers, graphite particles, needle coke, mesocarbon microbeads, carbon particles, carbon black, acetylene black, activated carbon particles, or a combination thereof. In some embodiments, the electron-conducting material is made into a fabric (woven or non-woven), paper, or foam structure. The foam structure may be a closed-cell foam, but preferably an open-cell foam. The construction or production of these electron-conducting materials in a fabric, paper, or foam structure is well-known in the art.

Preferably, the electron-conducting porous structure contains a graphene foam. Generally speaking, a foam (or foamed material) is composed of pores (or cells) and pore walls (the solid portion of a foam material). The pores can be interconnected to form an open-cell foam. A graphene foam is composed of pores and pore walls that contain a graphene material. There are several major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range from 180–300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process.

The fourth method of producing a graphene foam (Aruna Zhamu and Bor Z. Jang, "Highly Conductive Graphene Foams and Process for Producing Same," U.S. patent application Ser. No. 14/120,959 (Jul. 17, 2014); U.S. Publication No. 20160019995 (Jan. 21, 2016)) comprises:

(a) preparing a graphene dispersion having particles of an anode active material and a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent;

(b) dispensing and depositing the graphene dispersion onto a surface of a supporting substrate (e.g. plastic film, rubber sheet, metal foil, glass sheet, paper sheet, etc.) to form a wet layer of graphene-anode material mixture, wherein the dispensing and depositing procedure includes subjecting the graphene dispersion to an orientation-inducing stress;

(c) partially or completely removing the liquid medium from the wet layer of graphene-anode material mixture to form a dried layer of material mixture having a content of non-carbon elements (e.g. O, H, N, B, F, Cl, Br, I, etc.) no less than 5% by weight; and (d) heat treating the dried layer of material mixture at a first heat treatment temperature from 100° C. to 3,200° C. at a desired heating rate sufficient to induce volatile gas molecules from the non-carbon elements or to activate the blowing agent for producing the anode layer.

The solid graphene foam in the anode layer typically has a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

This optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

In certain embodiments, the lithium ion-conducting porous structure comprises a polymer foam or polymer fabric having pores and pore walls. The pore walls comprise a lithium ion-conducting polymer having a lithium ion conductivity from $10^{-8}$ to $10^{-2}$ S/cm when measured at 25° C.

In some embodiments, the lithium ion-conducting polymer is selected from sulfonated polyaniline, sulfonated polypyrrole, a sulfonated polythiophene, sulfonated polyfuran, a sulfonated bi-cyclic polymer, or a combination thereof. These sulfonated polymers are found to be both electron-conducting and lithium ion-conducting.

In some embodiments, the lithium ion-conducting polymer contains a sulfonated rubber or elastomer selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, metallocene-based sulfonated poly(ethylene-co-octene) elastomer, sulfonated poly(ethylene-co-butene) elastomer, sulfonated styrene-ethylene-butadiene-styrene elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate, sulfonated thermoplastic elastomer, sulfonated protein resilin, sulfonated protein elastin, sulfonated ethylene oxide-epichlorohydrin copolymer, sulfonated polyurethane, sulfonated urethane-urea copolymer, or a combination thereof.

In some embodiments, the lithium ion-conducting polymer is selected from the group consisting of poly(perfluoro sulfonic acid), sulfonated polytetrafluoroethylene, sulfonated perfluoroalkoxy derivatives of polytetra-fluoroethylene, sulfonated polysulfone, sulfonated poly(ether ketone), sulfonated poly (ether ether ketone), sulfonated polystyrene, sulfonated polyimide, sulfonated styrene-butadiene copolymers, sulfonated poly chloro-trifluoroethylene, sulfonated perfluoroethylene-propylene copolymer, sulfonated ethylene-chlorotrifluoroethylene copolymer, sulfonated polyvinylidenefluoride, sulfonated copolymers of polyvinylidenefluoride with hexafluoropropene and tetrafluoroethylene, sulfonated copolymers of ethylene and tetrafluoroethylene, polybenzimidazole, and chemical derivatives, copolymers, and blends thereof.

The production of sulfonation polymers is well-known in the art. One may produce a sulfonated polymer by polymerizing a sulfonated monomer or a monomer containing a sulfonyl group (e.g. T. G. Dang, et al. U.S. Publication No. 2005/0165213 (Jul. 28, 2005)). Preferably, one may sulfonate a polymer by immersing the polymer in a concentrated sulfuric acid (e.g. concentration >90%). For details one may consult C. J. Cornelius, et al. U.S. Pat. No. 7,301,002 (Nov. 27, 2007) and references cited therein. In some embodiments, a desired polymer is made into fibers and then a fabric or paper structure, which is followed by a sulfonation treatment. Alternatively, one may use a chemical blowing agent or physical blowing agent to assist in forming a polymer foam structure (e.g. a film or sheet shape). The resulting porous structure (fabric, paper, or foam, etc.) may then be soaked with the lithium ion-capturing molecules or ionic salt solution discussed above.

In some embodiments, the lithium ion-conducting polymer is selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazene, Polyvinyl chloride, Polydimethylsiloxane, and poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, or a combination thereof. These materials can be readily made into a porous structure such as a fabric, paper, or foam structure.

There are several approaches that can be followed to form a lithium ion reservoir composed of a conducting framework porous structure (foam, paper, fabric, etc.) having pores filled with lithium ion-capturing molecules or ions. It may be noted that these molecules or ions either have a low melting point (lower than 100° C. or even <25° C.) and, thus, can be easily melted to become a highly flowable state, or can be dissolved in a liquid solvent to become solution. Hence, these lithium ion-capturing species can be readily made to permeate into pores of the porous framework structure. Such permeation can be accomplished by using, for instance, the following procedures:
(a) Solution permeation: This includes dispersion or dissolution of molecules or ions in water or a solvent to form a solution or suspension, followed by coating or spraying the solution onto the porous structure or by dipping the porous structure into this solution or suspension; or
(b) Melt mixing: This includes bringing the molecules or ionic species into a molten (liquid) state and allowing the liquid to permeate into the pores of the porous structure using, coating, spraying, dipping, etc.

Specifically, one may dispense and deposit a layer of the species in a liquid or solution state onto a primary surface of the porous structure using air pressure-assisted spraying, ultrasonic spraying, casting, coating, and the like, preferably followed by a roll-pressing or other means of consolidating the lithium ion reservoir layer.

In the lithium-ion battery, the anode (sometimes referred to as anode electrode) typically is composed of an anode active material, a conductive additive (e.g. carbon black, acetylene black, graphite platelets, carbon nanotubes, etc.), and a resin binder (e.g. the well-known SBR rubber, PVDF, CMC, etc.). In some embodiments, the anode electrode may comprise an anode active material comprising an element selected from Si, Ge, Sn, Cd, Sb, Pb, Bi, Zn, Al, Co, Ni, Ti, or an alloy thereof.

In some embodiments, the anode comprises an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; (F) lithiated and un-lithiated particles of natural graphite, artificial graphite, mesocarbon microbeads, hard carbon (commonly defined as the carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube; and combinations thereof.

The anode of a lithium-ion battery may be made by using the well-known slurry coating method. For instance, one may mix particles of an anode active material (e.g. carbon-coated Si nanoparticles or nanowires), a resin binder (e.g. SBR rubber, CMC, polyacrylamide), and a conductive filler (e.g. particles of acetylene black, carbon black, or carbon nanotubes) in water or an organic solvent (e.g. NMP) to form a slurry. The slurry is then coated on one primary surface or both primary surfaces of a Cu foil and then dried to form an anode electrode. For the anode of a lithium metal battery, one may simply use a thin Li foil attached to a Cu foil or a graphene-based current collector.

The particles of an anode active material (e.g. Si, Ge, $SiO_x$, Sn, $SnO_2$, etc., wherein x=0.01-1.9) preferably have a diameter from 5 nm to 1 μm, more preferably from 10 to 500 nm, and most preferably from 20 to 100 nm.

There is no restriction on the type of porous separator that can be used in the presently invented lithium battery. A porous separator (e.g. polyolefin-based, non-woven of electrically insulating fibers, etc.) may be used in lithium secondary batteries for the purpose of preventing short circuiting between an anode and a cathode, but having pores serving as a passage for lithium ions. Most of the commercially available lithium batteries make use of a polyolefin (e.g. polyethylene, polypropylene, PE/PP copolymer, etc.) as a separator.

There is essentially no restriction on the type of cathode active materials for use in the presently invented protected lithium cells. The cathode active material in the cathode in this rechargeable alkali metal battery may be selected from sulfur, selenium, tellurium, lithium sulfide, lithium selenide, lithium telluride, sodium sulfide, sodium selenide, sodium telluride, a chemically treated carbon or graphite material having an expanded inter-graphene spacing $d_{002}$ of at least 0.4 nm, or an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, nickel, or a combination thereof. Preferred cathode active materials include non-lithiated and slightly lithiated compounds having relatively high lithium or sodium storage capacities, such as $TiS_2$, $MoS_2$, $MnO_2$, $CoO_2$, and $V_2O_5$.

A novel family of 2D metal carbides or metal carbonides, now commonly referred to as MXenes, can be used as a cathode active material. MXenes can be produced by partially etching out certain elements from layered structures of metal carbides such as $Ti_3AlC_2$. For instance, an aqueous 1 M $NH_4HF_2$ was used at room temperature as the etchant for $Ti_3AlC_2$. Typically, MXene surfaces are terminated by O, OH, and/or F groups, which is why they are usually referred to as $M_{n+1}X_nT_x$, where M is an early transition metal, X is C and/or N, T represents terminating groups (O, OH, and/or F), n=1, 2, or 3, and x is the number of terminating groups. The MXene materials investigated include $Ti_2CT_x$, $(Ti_{0.5}, Nb_{0.5})_2CT_x$, $Nb_2CT_x$, $V_2CT_x$, $Ti_3C_2T_x$, $(V_{0.5}, Cr_{0.5})_3C_2T_x$, $Ti_3CNT_x$, $Ta_4C_3T_x$, and $Nb_4C_3T_x$.

In an embodiment, the cathode layer contains an air cathode and the battery is a lithium-air battery. In another embodiment, the cathode active material is selected from sulfur or lithium polysulfide and the battery is a lithium-sulfur battery. In yet another embodiment, the cathode active material may be selected from an organic or polymeric material capable of capturing or storing lithium ions (e.g. via reversibly forming a redox pair with lithium ion).

In the cathode electrode of a lithium-ion battery, the cathode active material may be selected from a metal oxide/phosphate/sulfide/halogenide, an inorganic material, an organic or polymeric material, or a combination thereof:
a) the group of metal oxide, metal phosphate, and metal sulfides consisting of lithium cobalt oxide, lithium nickel oxide, lithium manganese oxide, lithium vanadium oxide, lithium transition metal oxide, lithium-mixed metal oxide (e.g. the well-known NCM, NCA, etc.), transition metal fluoride, transition metal chloride, lithium iron phosphate, lithium manganese phosphate, lithium vanadium phosphate, lithium mixed metal phosphates, transition metal sulfides, and combinations thereof.
  a. In particular, the lithium vanadium oxide may be selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein 0.1<x<5;

b. Lithium transition metal oxide may be selected from a layered compound $LiMO_2$, spinel compound $LiM_2O_4$, olivine compound $LiMPO_4$, silicate compound $Li_2MSiO_4$, tavorite compound $LiMPO_4F$, borate compound $LiMBO_3$, or a combination thereof, wherein M is a transition metal or a mixture of multiple transition metals.

b) an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, $TiS_2$, $TaS_2$, $MoS_2$, $NbSe_3$, non-lithiated $MnO_2$, $CoO_2$, iron oxide, vanadium oxide, or a combination thereof may be used as a cathode active material in a lithium metal cell.

c) the organic material or polymeric material may be selected from poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, quino(triazene), redox-active organic material, tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$] n), lithiated 1,4,5,8-naphthalenetetraol formaldehyde polymer, hexaazatrinaphtylene (HATN), hexaazatriphenylene hexacarbonitrile (HAT(CN)$_6$), 5-benzylidene hydantoin, isatine lithium salt, pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer is selected from poly[methanetetryl-tetra(thiomethylene)] (PMTTM), poly(2,4-dithiopentanylene) (PDTP), a polymer containing poly(ethene-1,1,2,2-tetrathiol) (PETT) as a main-chain thioether polymers, a side-chain thioether polymer having a main-chain consisting of conjugating aromatic moieties, and having a thioether side chain as a pendant, poly(2-phenyl-1,3-dithiolane) (PPDT), poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

The organic material may include a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode of a lithium-ion battery may be made by using the well-known slurry coating method. For instance, one may mix particles of a cathode active material (e.g. particles of NMC, NCA, $LiCoO_2$, $TiS_2$, graphene-protected S particles, etc.), a resin binder (e.g. PVDF), and a conductive filler (e.g. particles of acetylene black, carbon black, or carbon nanotubes) in an organic solvent (e.g. NMP) to form a slurry. The slurry is then coated on one primary surface or both primary surfaces of an Al foil and then dried to form a cathode electrode.

The electrolytes that can be used in the lithium battery may be selected from any lithium metal salt that is dissolvable in a solvent to produce an electrolyte. Preferably, the metal salt is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), li-fluoroalkyl-phosphates (LiPF$_3$(CF$_2$CF$_3$)$_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), or a combination thereof.

The electrolytes used may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. The ionic liquid may also be used as an electrolyte for the lithium battery.

The anode of a lithium-ion battery may contain anode active material particles selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

At the anode side, the anode active material of a lithium metal battery may contain a layer of Li metal or alloy (>70% by weight of Li, preferably >80%, and more preferably >90%). Alternatively, the Li metal or alloy may be supported by a nanostructure composed of conductive nanofilaments. For instance, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting paths. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electrospinning of polyacrylonitrile (PAN) into polymer nanofibers, followed by carbonization of PAN. It may be noted that some of the pores in the structure, as carbonized, are greater than 100 nm and some smaller than 100 nm.

In summary, a possible lithium cell may be comprised of an alkali metal layer (e.g. Li foil, etc.) or an anode active material particle layer (e.g. particles of Si plus conductive additive and binder resin), an anode current collector (e.g. Cu foil and/or a nanostructure of interconnected conductive filaments) supporting the anode layer, a lithium ion reservoir layer, a porous separator and an electrolyte phase, a cathode, and an optional cathode current collector (e.g. Al foil and/or or a nanostructure of interconnected conductive filaments, such as graphene sheets and carbon nanofibers) to support the cathode layer. These layers may be laminated together to form a battery cell, followed by injection of a liquid electrolyte (if electrolyte is not yet incorporated in the laminate). The battery cell production procedures are well-known in battery industry.

The following examples serve to illustrate the preferred embodiments of the present invention and should not be construed as limiting the scope of the invention:

Example 1: Synthesis of Sulfonated Polyaniline (S-PANi)

The chemical synthesis of the S-PANi polymers was accomplished by reacting polyaniline with concentrated sulfuric acid. The procedure was similar to that used by Epstein, et al. (U.S. Pat. No. 5,109,070, Apr. 28, 1992). The resulting S-PANi can be represented by the following Formula 1, with $R_1$, $R_2$, $R_3$, and $R_4$ group being H, $SO_3^-$ or $SO_3H$ ($R_5$=H) with the content of the latter two being varied between 30% and 75% (i.e., the degree of sulfonation varied between 30% and 75%).

(Formula 1)

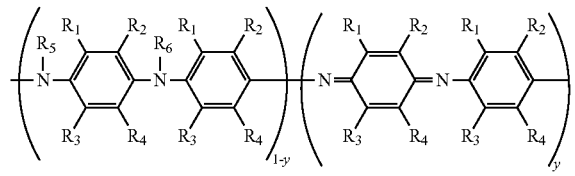

The lithium ion conductivity of these $SO_3^-$ or $SO_3H$-based S-PANi compositions was in the range from $8.5\times10^{-5}$ S/cm to $4.6\times10^{-3}$ S/cm and their electron conductivity in the range from 0.1 S/cm to 0.5 S/cm when the degree of sulfonation was from approximately 30% to 75% (with y being approximately 0.4-0.6).

The porous framework for the lithium ion reservoir layer was obtained by dissolving S-PANi in water to form a polymer-water solution, which was freeze-dried to obtain a sponge-like foamed structure. A porosity level from approximately 20% to 85% was achieved. Upon fully drying the foam, the pores in several foam structures were impregnated with several different lithium ion-capturing species, respectively: including lithium 4-methylbenzenesulfonate, lithium aniline sulfonate, lithium sulfate, lithium phosphate, and an ionic liquid having a 1-ethyl-3-methylimidazolium (EMI) cation and an N,N-bis(trifluoromethane)sulfonamide (TFSI) anion.

The resulting lithium ion-capturing reservoir layers were then implemented in several lithium cells, including lithium-ion cells ("graphite anode+NCA cathode" and "anode of graphene-protected Si particles+NCM cathode") and lithium metal cells ("Li metal foil anode+$MoS_2$ cathode" and "Li metal anode+graphene/S cathode).

We have observed that, by implementing a lithium ion reservoir between the anode layer and the porous separator layer, one enables the resulting lithium-ion batteries or lithium metal batteries to be fast-charged at a rate of 10 C to 30 C with only a 10% capacity reduction as compared to the battery measured at a rate of 0.5 C. In contrast, when recharged at a high C rate (e.g. 10 C), the capacity of the conventional battery is less than 50% of the original capacity measured at 0.5 C rate.

Example 2: Sulfonation of Electrically Non-Conducting Polymers

Polytetrafluoroethylene (PTFE), polysulfone (PSf), poly (ether ether ketone) (PEEK), polyimide (PI), and styrene-butadiene copolymers (SB) were separately immersed in a concentrated sulfuric acid (95%+5% water) at 65-90° C. for 4-48 hours to obtain sulfonated polymers. These sulfonated polymers were found to be electrically insulating ($<10^{-8}$ S/cm), but lithium ion-conducting (typically $3\times10^{-5}$ S/cm-$4.5\times10^{-3}$ S/cm, depending on the degree of sulfonation).

These highly sulfonated polymers, along with some desired amounts of baking soda as a blowing agent, were dissolved in water to form solutions, which were cast to form thin films onto a glass substrate and heated at 100° C.-250° C. for 0.3 to 5 minutes to produce porous structures. In one additional sample, graphene oxide sheets (graphene/polymer ratio=1/10) were added to the sulfonated PEEK/baking soda solution to form a slurry, which was cast, dried, and heat-treated at 300° C. for 5 minutes to obtain a graphene-enhanced S-PEEK foam structure that was both electron-conducting and lithium ion-conducting. All these foamed structures were separately impregnated with lithium aniline sulfonate or lithium sulfate to form lithium ion reservoir layers.

Example 3: Preparation of Graphene Oxide Sheets (GO) and Reduced Graphene Oxide (RGO) Foam Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a stainless steel plate. A wiper was used to exert shear stresses at a high shearing rate, inducing GO sheet orientations. The wet GO suspension was then dried. For making a graphene foam specimen, the GO suspension was then subjected to heat treatments that typically involve an initial thermal reduction temperature of 80° C.-350° C. for 1-8 hours, followed by heat-treating at a second temperature of 1,500° C.-2,850° C. for 0.5 to 5 hours. We have found it essential to apply a compressive stress to the sample while being subjected to the first heat treatment. This compress stress seems to have helped maintain good contacts between the graphene sheets so that chemical merging and linking between graphene sheets can occur while pores are being formed. Without such a compressive stress, the heat-treated sample was typically excessively porous with constituent graphene sheets in the pore walls being very poorly oriented and incapable of chemical merging and linking with one another. As a result, the thermal conductivity, electrical conductivity, and mechanical strength of the graphene foam were compromised.

The resulting graphene foam structures were then separately dipped in several lithium ion-capturing species in a liquid state, including sodium 4-methylbenzenesulfonate, sodium aniline sulfonate, sodium sulfate, sodium phosphate, and an ionic liquid having a tetra-alkylimidazolium cation and a $BF_4^-$ anion, to prepare various lithium ion reservoir layers.

Example 4: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-dinitroso pentamethylene tetramine or 4. 4'-oxybis (benzenesulfonyl hydrazide) were added to a suspension containing pristine graphene sheets and a surfactant. The suspension was then cast onto a glass surface using a doctor's blade to exert shear stresses, inducing graphene sheet orientations. Several samples were cast, including one that was made using $CO_2$ as a physical blowing agent introduced into the suspension just prior to casting). The resulting graphene suspension shapes, after removal of liquid, have a thickness that can be varied from approximately 0.1 mm to 50 mm.

The graphene shapes were then subjected to heat treatments that involve an initial (first) thermal reduction temperature of 80° C.-1,500° C. for 1-5 hours. This first heat treatment generated a graphene foam structure. Some of the pristine foam samples were then subjected to a second temperature of 1,500° C.-2,850° C. to further perfect the graphene foam structure (re-graphitized to become more ordered or having a higher degree of crystallinity). These foam structures were used as a framework porous structure for accommodating lithium ion-capturing species.

Example 5: Lithium Ion-Conducting Polymer-Based Porous Structures

Figure 2:
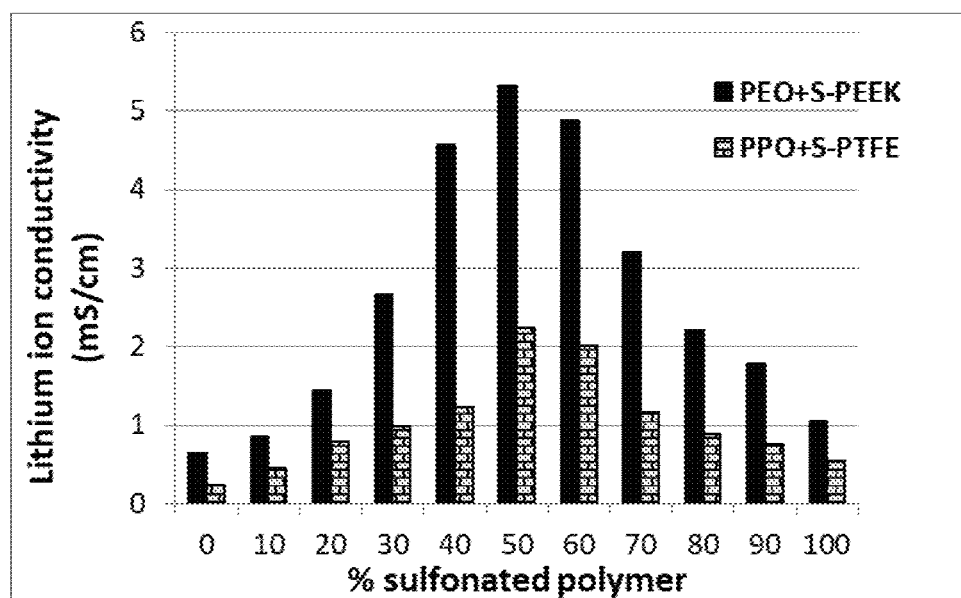
FIG. 2 Lithium ion conductivity values in a solid polymer mixture of a sulfonated polymer (S-PEEK or S-PTFE) and a conventional electrolyte polymer (PEO or PPO) plotted as a function of the sulfonated polymer proportion (each containing 30% by weight of lithium salt).

Another group of presently invented lithium ion-conducting framework porous structures to retain lithium ion-capturing species therein typically comprises a mixture of a conventional lithium ion-conducting electrolyte polymer (e.g. PEO, PPO, etc.) and a sulfonated polymer. As shown in FIG. 2, the lithium ion conductivity values of a polymer mixture containing a conventional solid electrolyte polymer (PEO or PPO) and a sulfonated polymer exhibit unexpected synergistic effect. Some electron-conducting fillers (e.g. carbon nanotubes (CNF), carbon nanofibers (CNT), carbon black (CB), expanded graphite flakes (EGF), etc.) were added into lithium ion-conducting polymers to make a material both electron-conducting and lithium ion-conducting. Such a material appears to be more effective in capturing lithium ions during the fast battery charge operations, retaining more lithium ions in the resulting reservoir and continuing to send lithium ions into the anode layer even after the external charger unit is switched off.

TABLE 2

Lithium ion conductivity of various conducting framework porous structure materials.

| Sample No. | Conducting CNTs or carbon fibers (CF), etc. particles | Lithium-conducting polymer (non-sulfonated polymer) | Li-ion conductivity (S/cm) |
|---|---|---|---|
| D1 | CNT + CB | PEO (15-85% by wt.) | $1.1 \times 10^{-4}$ to $8.5 \times 10^{-4}$ S/cm |
| D2 | CNF | PEO (5-95% by wt.) | $2.3 \times 10^{-4}$ to $8.2 \times 10^{-4}$ S/cm |

TABLE 2-continued

Lithium ion conductivity of various conducting framework porous structure materials.

| Sample No. | Conducting CNTs or carbon fibers (CF), etc. particles | Lithium-conducting polymer (non-sulfonated polymer) | Li-ion conductivity (S/cm) |
|---|---|---|---|
| D3 | EGF | PEO | $2.3 \times 10^{-4}$ to $7.2 \times 10^{-4}$ S/cm |
| D4 | CNF + EGF | PAN | $6.5 \times 10^{-5}$ to $5.3 \times 10^{-4}$ S/cm |
| D5 | CNF + graphene | PPO | $6.8 \times 10^{-5}$ to $4.9 \times 10^{-4}$ S/cm |
| D6 | CNT + graphene | PEO + S-PANi | $5.9 \times 10^{-4}$ to $7.7 \times 10^{-3}$ S/cm |
| D7 | CNT | PEO + S-PSf | $3.4 \times 10^{-4}$ to $1.3 \times 10^{-3}$ S/cm |

Example 6: Preparation of $MoS_2$/RGO Hybrid Cathode Material for Li Metal Cells (GO=Graphene Oxide; RGO=Reduced Graphene Oxide)

Ultra-thin $MoS_2$/RGO hybrid was synthesized by a one-step solvothermal reaction of $(NH_4)_2MoS_4$ and hydrazine in an N, N-dimethylformamide (DMF) solution of graphene oxide (GO) at 200° C. In a typical procedure, 22 mg of $(NH_4)_2MoS_4$ was added to 10 mg of GO dispersed in 10 ml of DMF. The mixture was sonicated at room temperature for approximately 10 min until a clear and homogeneous solution was obtained. After that, 0.1 ml of $N_2H_4$—$H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for at least 5 times to ensure that most DMF was removed. Finally, product was dried and made into a cathode.

The cathode layer, coated on an Al foil, was combined with a porous separator, a lithium ion reservoir layer, and a lithium metal foil (supported by a Cu foil) to make a battery cell. The electrolyte used was a quasi-solid electrolyte (3.5 M of $LiPF_6$ in PC-EC solvent mixture). The resulting battery was found to be highly fire resistant when nail-penetrated.

Example 7: Preparation of Graphene-Enabled $Li_xV_3O_8$ Nanosheets as a Cathode for a Li-Ion Cell All chemicals used in this study were analytical grade and were used as received without further purification. $V_2O_5$ (99.6%, Alfa Aesar) and LiOH (99+%, Sigma-Aldrich) were used to prepare the precursor solution. Graphene oxide (GO, 1% w/v obtained from Taiwan Graphene Co., Taipei, Taiwan) was used as a structure modifier. First, $V_2O_5$ and LiOH in a stoichiometric V/Li ratio of 1:3 were dissolved in actively stirred de-ionized water at 50° C. until an aqueous solution of $Li_xV_3O_8$ was formed. Then, GO suspension was added while stirring, and the resulting suspension was atomized and dried in an oven at 160° C. to produce the spherical composite particulates of GO/$Li_xV_3O_8$ nanosheets and the sample was designated NLVO-1. Corresponding $Li_xV_3O_8$ materials were obtained under comparable processing conditions, but without graphene oxide sheets. The sample was designated as LVO-2.

The Nyquist plots obtained from electrical impedance tests show a semicircle in the high to medium frequency range, which describes the charge-transfer resistance for both electrodes. The intercept value is considered to represent the total electrical resistance offered by the electrolyte. The inclined line represents the Warburg impedance at low frequency, which indicates the diffusion of ions in the solid matrix. The values of Rct for the vanadium oxide alone and graphene-enhanced composite electrodes are about 50.0 and 350.0Ω for NLVO-1 and LVO-2, respectively. The Rct of the composite electrode is much smaller than that of the LVO electrode. Therefore, the presence of graphene (<2% by weight in this case) in the vanadium oxide composite has dramatically reduced the internal charge transfer resistance and improved the battery performance upon extended cycling. NLVO-1 was subsequently used in two Li-ion cells (one featuring a Li ion reservoir layer and the other not) for evaluation of the effect of a lithium ion reservoir layer on the maximum amount of charges that can be stored in the anode.

The NLVO-based cathode material was formed into a cathode and then combined with a layer of lithiated natural graphite particles (as an anode), a lithium ion reservoir layer and a porous separator layer (Celgard 2400) to prepare a lithium-ion battery. A corresponding cell containing no lithium ion reservoir layer was also prepared for comparison purpose. The electrolyte was a conventional PEO gel electrolyte containing $LiPF_6$ in PC-EC solvent.

Figure 3:
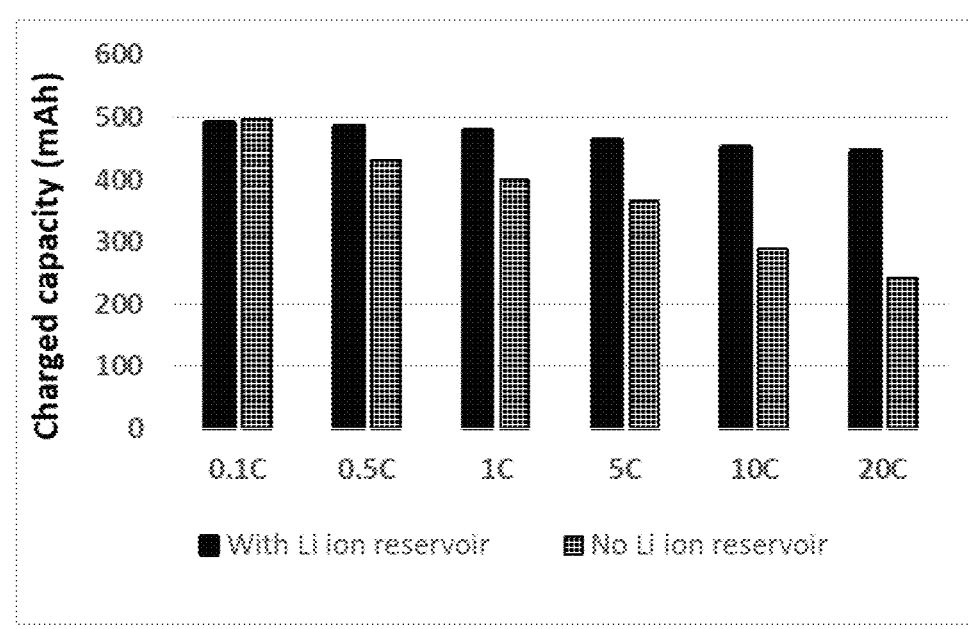
FIG. 3 The actual charge storage capacity values of two cells each containing an anode of lithiated natural graphite particles and a cathode of GO/$Li_xV_3O_8$ nanosheets are plotted as a function of the C rates. One cell contains a lithium ion reservoir disposed between the anode and the porous separator, but the other cell does not have such a reservoir.

The capacity of both cells was designed to be approximately 500 mAh in these two pouch cells. The actual charge storage capacity values of these two cells as a function of the charging C rates are summarized in FIG. 3, which clearly demonstrates the surprising effectiveness of the presently invented lithium ion reservoir approach to maintaining a high capacity at very high C rates.

Example 8: Relatively Fast-Chargeable Li—S Batteries

The cathode electrode was prepared following the following procedure. The electrochemical deposition of sulfur (S) was conducted before the cathode active layer was incorporated into a lithium-sulfur battery cell (Li—S). The anode, the electrolyte, and the integral layer of porous graphene structure (serving as a cathode layer) are positioned in an external container outside of a lithium-sulfur cell. The needed apparatus was similar to an electroplating system, which is well-known in the art.

In a typical procedure, a metal polysulfide ($Li_2S_9$ and $Nai_2S_6$) was dissolved in a solvent (e.g. mixture of DOL/DME at a volume ratio from 1:3 to 3:1) to form an electrolyte solution. The electrolyte solution was then poured into a chamber or reactor under a dry and controlled atmosphere condition (e.g. He or Nitrogen gas). A metal foil was used as the anode and a layer of the porous graphene foam structure as the cathode; both being immersed in the electrolyte solution. This configuration constitutes an electrochemical deposition system. The step of electrochemically depositing nanoscaled sulfur particles or coating on the graphene surfaces was conducted at a current density preferably in the range from 1 mA/g to 10 A/g, based on the layer weight of the porous graphene structure.

The chemical reactions that occurred in this reactor may be represented by the following equation: $M_x S_y \rightarrow M_x S_{y-z}$ + zS (typically z=1-4). Quite surprisingly, the precipitated S is preferentially nucleated and grown on massive graphene surfaces to form nanoscaled coating or nanoparticles. The coating thickness or particle diameter and the amount of S coating/particles was controlled by the specific surface area, electrochemical reaction current density, temperature and time. In general, a lower current density and lower reaction temperature lead to a more uniform distribution of S and the reactions are easier to control. A longer reaction time leads to a larger amount of S deposited on graphene surfaces and the reaction is ceased when the sulfur source is consumed or when a desired amount of S is deposited.

Several Li—S cells were produced wherein lithium metal foil was used as an anode active material and lithium trifluoromethane-sulfonimide (LiTFSI), dissolved in 1,3-dioxolane (DOL), was used as the electrolyte. In a first group of Li—S cells, a lithium ion reservoir layer obtained in Example 1 was implemented between a porous PE-PP separator and a lithium foil anode layer. In a second group of Li—S cells, graphene-reinforced sulfonated PEEK porous framework structure-based lithium ion reservoir (containing lithium aniline sulfonate or lithium phosphate as the lithium ion-capturing species), prepared in Example 2 was implemented between the Li metal anode and the porous separator. Baseline Li—S cells containing no lithium ion reservoir were also prepared and tested for comparison.

It was observed that, the implementation of a lithium ion reservoir between the Li foil anode layer and the porous separator layer makes the resulting lithium-sulfur batteries fast-charged at a rate of 5 C to 15 C with only a 12-17% capacity reduction as compared to the same Li—S battery measured at a rate of 0.5 C. In contrast, when recharged at a high C rate (e.g. 10 C), the capacity of the baseline battery is reduced to become less than 50% of the original capacity measured at 0.5 C rate.

Figure 4:
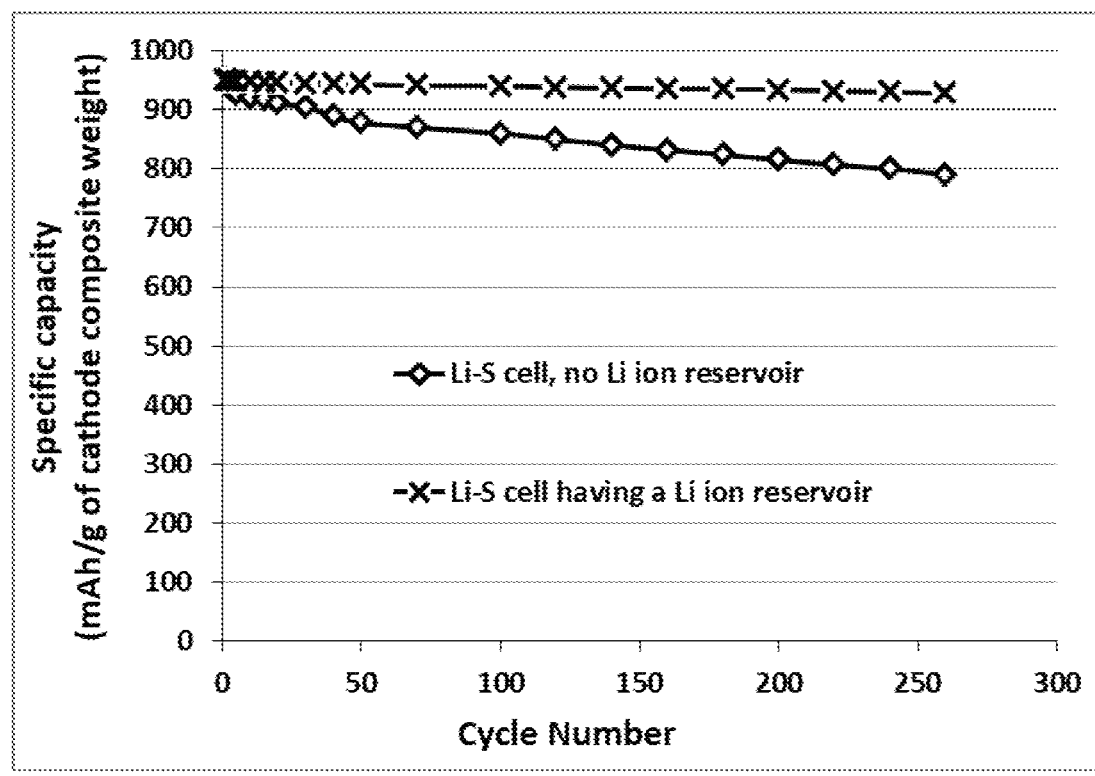
FIG. 4 The discharge capacity values of two Li—S cells (each featuring a Li foil as the anode active material and graphene-supported sulfur as the cathode active material) are plotted as a function of the number of charge/discharge cycles. One cell contains a lithium ion reservoir disposed between the Li metal anode and the separator, but the other cell does not have such a reservoir.

The discharge capacity values of two Li—S cells (each featuring a Li foil as the anode active material and graphene-supported sulfur as the cathode active material) are plotted as a function of the number of charge/discharge cycles (FIG. 4). One cell contains a lithium ion reservoir disposed between the Li metal anode and the separator, but the other cell does not have such a reservoir. It is quite unexpected to observe that the implementation of such a lithium ion reservoir layer also results in a significantly more stable cycling behavior. Examination of post-cycling specimens led to the observation of a significant amount of dead lithium particles separated from the lithium foil anode of the cell containing no lithium ion reservoir. In contrast, the lithium metal anode surface of the cell featuring a lithium ion reservoir appeared relatively smooth and very few dead Li particles were observed. Such a reservoir layer seems capable of helping to stabilize the lithium metal-electrolyte interface zone and prevent dendrite formation, leading to a much longer cycle-life for a safer rechargeable lithium metal battery. Such a lithium ion reservoir strategy also enables the normally slow-charging lithium metal battery (including Li—S cell) to become fast chargeable.

The invention claimed is:

1. A method of improving fast-chargeability of a lithium secondary battery comprising an anode, a cathode, a porous separator disposed between said anode and said cathode, and an electrolyte, wherein said method comprises disposing a lithium ion reservoir between said anode and said porous separator and configured to receive lithium ions from said cathode through said porous separator when said battery is charged and to enable said lithium ions to enter said anode in a time-delayed manner, wherein said lithium ion reservoir comprises a lithium ion-conducting porous framework structure having pores, having a pore size from 1 nm to 500 µm, and lithium-capturing groups residing in said pores, wherein said lithium-capturing groups are selected from (a) redox forming species that reversibly form a redox pair with a lithium ion when said battery is charged; (b) electron-donating groups interspaced between non-electron-donating groups; (c) anions and cations wherein the anions are more mobile than the cations; or (d) chemical reducing groups that partially reduce lithium ions from $Li^{+1}$ to $Li^{+\delta}$, wherein $0<\delta<1$, wherein said lithium ion-conducting porous structure comprises a polymer foam or polymer fabric having pore walls comprising a lithium ion-conducting polymer having a lithium ion conductivity from $10^{-8}$ to $10^{-2}$ S/cm when measured at 25° C., wherein said lithium ion conducting polymer comprises a sulfonated polymer, wherein said sulfonated polymer is selected from sulfonated polyaniline, sulfonated polypyrrole, a sulfonated polythiophene, sulfonated polyfuran, a sulfonated bi-cyclic polymer, sulfonated natural polyisoprene, sulfonated synthetic polyisoprene, sulfonated polybutadiene.

2. The method of claim 1, wherein said lithium ion reservoir comprises an ionic liquid hosted by a porous structure.

3. The method of claim 1, wherein the lithium-capturing group is selected from a molecule having a core or backbone structure and at least a side group that contains an ionic or electron rich group; wherein the core or backbone structure is selected from an aryl, heterocycloalkyl, crown etheryl, cyclamyl, cyclenyl, 1,4,7-triazacyclononayl, hexacyclenyl, cryptandyl, naphtalenyl, antracenyl, phenantrenyl, tetracenyl, chrysenyl, tryphenylenyl, pyrenyl, pentacenyl, single-benzene or cyclic structure, double-benzene or bi-cyclic structure, or multiple-cyclic structure having 3-10 benzene rings and wherein the side group comprises $CO_2H$, $CO_2M^1$, $CO_2R$, $SO_3H$, $SO_3M^1$, $PO_3H_2$, $PO_3M^1{}_2$, $PO_3M^1H$, $PO_4H_2$, $PO_4M^1{}_2$, $PO_4M^1H$, $PO_4M^2$, $C(O)NHOH$, $NH_2$, $NHR$, $N(R)_2$, $NO_2$, $COOR$, $CHO$, $CH_2OH$, $OH$, $OR$, $SH$, $SR$, $C(O)N(R)_2$, $C(O)NHR$, $C(O)NH_2$, halide, tosylate, mesylate, $SO_2NHR$, triflate, isocyanate, cyanate, thiocyanate, isothiocyanate, R, cyano, $CF_3$, or $Si(OR)_3$; wherein R is independently selected from methyl, ethyl, isopropyl, n-propyl, alkyl, haloalkyl, cycloalkyl, heterocycloalkyl, aryl, or benzyl; $M^1$ is selected from Li, Na, K, Rb, or Cs; and $M^2$ is selected from Be, Mg, Ca, Sr, or Ba.

4. The method of claim 1, wherein said redox pair with lithium is selected from the group consisting of lithium 4-methylbenzenesulfonate, lithium 3,5-dicarboxybenzenesulfonate, lithium 2,6-dimethylbenzene-1,4-disulfonate, 3,3'-((1,2-dithiane-4,5-diyl)bis(oxy))bis(N-hydroxypropanamide), 3,3'-((4-mercapto-1,2-phenylene)bis(oxy))bis(N-hydroxypropanamide), lithium aniline sulfonate, poly(lithium-4-styrenesulfonate, lithium sulfate, lithium phosphate, lithium phosphate monobasic, lithium trifluoromethanesulfonate, lithium 1,1,2,2,3,3,4,4,5,5,6,6,7,7,8,8,8-heptadecafluorooctane-1-sulfonate, lithium 2,6-di-tert-butylbenzene-1,4-disulfonate, lithium aniline sulfonate (wherein the sulfonate may be in any of para, meta and ortho positions), poly(lithium-4-styrenesulfonate, and combinations thereof.

5. The method of claim 1, wherein said lithium ion-capturing group comprises a salt that is dissociated into an anion and a cation in a liquid medium wherein said salt is selected from the group consisting of $Li_2CO_3$, $Li_2O$, $Li_2C_2O_4$, $LiOH$, $LiX$, $ROCO_2Li$, $HCOLi$, $ROLi$, $(ROCO_2Li)_2$, $(CH_2OCO_2Li)_2$, $Li_2S$, $Li_xSO_y$, $Na_2CO_3$, $Na_2O$, $Na_2C_2O_4$, $NaOH$, $NaX$, $ROCO_2Na$, $HCONa$, $RONa$, $(ROCO_2Na)_2$, $(CH_2OCO_2Na)_2$, $Na_2S$, $Na_xSO_y$, and combinations thereof, wherein X=F, Cl, I, or Br, R=a hydrocarbon group, 0<x≤1 and 1≤y≤4, and wherein said liquid medium to dissolve the salt contains a solvent selected from the group consisting of 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, hydrofluoro ether (FIFE), trifluoro propylene carbonate (FPC), methyl nonafluorobutyl ether (MFE), fluoroethylene carbonate (FEC), tris(trimethylsilyl)phosphite (TTSPi), triallyl phosphate (TAP), ethylene sulfate (DTD), 1,3-propane sultone (PS), propene sultone (PES), diethyl carbonate (DEC), alkylsiloxane (Si—O), alkyylsilane (Si—C), liquid oligomeric silaxane (—Si—O—Si—), tetraethylene glycol dimethylether (TEGDME), an ionic liquid solvent, and combinations thereof.

6. The method of claim 1, wherein said lithium ion-capturing groups comprise an ionic liquid having a cation selected from the group consisting of tetra-alkylammonium, di-, tri-, or tetra-alkylimidazolium, alkylpyridinium, dialkylpyrrolidinium, dialkylpiperidinium, tetraalkylphosphonium, trialkylsulfonium, and combinations thereof.

7. The method of claim 1, wherein said lithium ion-capturing groups comprise an ionic liquid having an anion selected from the group consisting of $BF_4^-$, $B(CN)_4^-$, $CH_3BF_3^-$, $CH_2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, and combinations thereof.

8. The method of claim 1, wherein said lithium ion-capturing groups comprise an ionic liquid having a 1-ethyl-3-methylimidazolium (EMI) cation and an N,N-bis(trifluoromethane)sulfonamide (TFSI) anion.

9. The lithium secondary battery of claim 1, wherein said pores comprise mesoscaled pores having a pore size from 2 nm to 50 nm.

10. The method of claim 1, wherein said lithium ion-conducting polymer further comprises a polymer selected from the group consisting of poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazene, polyvinyl chloride, polydimethylsiloxane, poly(vinylidene fluoride)-hexafluoropropylene (PVDF-HFP) copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, a derivative thereof, and combinations thereof.

11. The method of claim 1, wherein said anode comprises lithium metal or a lithium metal alloy as an anode active material.

12. The method of claim 1, wherein said anode comprises an anode active material selected from the group consisting of:
a) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd);
b) lithiated and un-lithiated alloys or intermetallic compounds of Si, Ge, Sn, Pb, Sb, Bi, Zn, Al, Ti, Ni, Co, or Cd with other elements;
c) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, Mn, V, or Cd, and their mixtures, composites, or lithium-containing composites;
d) lithiated and un-lithiated salts and hydroxides of Sn;
e) lithium titanate, lithium manganate, lithium aluminate, lithium-containing titanium oxide, lithium transition metal oxide;
f) lithiated and un-lithiated particles of natural graphite, artificial graphite, mesocarbon microbeads, hard carbon (carbon materials that cannot be graphitized at a temperature higher than 2,500° C.), soft carbon (carbon materials that can be graphitized at a temperature higher than 2,500° C.), needle coke, polymeric carbon, carbon or graphite fiber segments, carbon nanofiber or graphitic nanofiber, carbon nanotube;
and combinations thereof.

13. The method of claim 1, wherein said anode comprises particles of an anode active material having a size from 10 nm to 1 μm.

14. The method of claim 1, wherein said lithium secondary battery is a lithium-ion battery, a rechargeable lithium metal battery, a lithium-sulfur battery, a lithium-selenium battery, or a lithium-air battery.

15. A method of improving fast-chargeability of a lithium secondary battery comprising an anode, a cathode, a porous separator disposed between said anode and said cathode, and an electrolyte, wherein said method comprises disposing a lithium ion reservoir between said anode and said porous separator and configured to receive lithium ions from said cathode through said porous separator when said battery is charged and to enable said lithium ions to enter said anode in a time-delayed manner, wherein said lithium ion reservoir comprises a lithium ion-conducting porous framework structure having pores, having a pore size from 1 nm to 500 μm, and lithium-capturing groups residing in said pores, wherein said lithium-capturing groups are selected from (a) redox forming species that reversibly form a redox pair with a lithium ion when said battery is charged; (b) electron-donating groups interspaced between non-electron-donating groups; (c) anions and cations wherein the anions are more mobile than the cations; or (d) chemical reducing groups that partially, reduce lithium ions from $Li^{+1}$ to $Li^{+\delta}$, wherein $0<\delta<1$, wherein said lithium ion-conducting porous structure comprises a polymer foam or polymer fabric having pore walls comprising a lithium ion-conducting polymer having a lithium ion conductivity from $10^{-8}$ to $10^{-2}$ S/cm when measured at 25° C., wherein said lithium ion-conducting polymer is selected from the group consisting of sulfonated polyaniline, sulfonated polypyrrole, a sulfonated polythiophene, sulfonated polyfuran, a sulfonated bi-cyclic polymer, and combinations thereof.

* * * * *